US012135902B2

(12) United States Patent
Ellegaard et al.

(10) Patent No.: US 12,135,902 B2
(45) Date of Patent: Nov. 5, 2024

(54) CIRCUIT AND TIMER FOR MEMORY

(71) Applicant: Microchip Technology Incorporated, Chandler, AZ (US)

(72) Inventors: Lars Ellegaard, Copenhagen S (DK); Torkil Oelgaard, Hellerup (DK)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/812,379

(22) Filed: Jul. 13, 2022

(65) Prior Publication Data

US 2023/0026431 A1 Jan. 26, 2023

Related U.S. Application Data

(60) Provisional application No. 63/203,475, filed on Jul. 23, 2021.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0604; G06F 3/0659; G06F 3/0679; H04L 12/64; H04L 12/66; H04L 49/206; H04L 49/35; H04L 49/604; H04L 67/125
See application file for complete search history.

(56) References Cited

U.S. PATENT DOCUMENTS

| | | | |
|---|---|---|---|
| 5,509,012 A | 4/1996 | Chung et al. | |
| 6,965,737 B1* | 11/2005 | Somashekhar | H04B 10/29 398/54 |
| 2013/0073820 A1* | 3/2013 | Watanabe | G06F 3/0659 711/E12.103 |
| 2019/0370062 A1* | 12/2019 | Leyrer | G06F 9/5038 |
| 2020/0371703 A1* | 11/2020 | Su | G06F 3/0604 |

OTHER PUBLICATIONS

International Search Report for International Application No. PCT/US2022/073692. Oct. 12, 2022, 5 pages.
Written Opinion of the International Searching Authority of International Application No. PCT/US2022/073692, mailed Oct. 12, 2022, 9 pages.

* cited by examiner

*Primary Examiner* — Aracelis Ruiz
(74) *Attorney, Agent, or Firm* — TraskBritt

(57) ABSTRACT

Various examples may include an apparatus including a memory to store ingressing data or egressing data, a timer to generate a timing signal responsive to a user-configurable time interval, and a circuit to move the ingressing data or the egressing data from the memory at least partially responsive to the timing signal generated by the timer. Various examples may include a method including receiving a data packet at a network-facing interface, writing data of the data packet into a memory, receiving a timing signal, and responsive to the timing signal, providing the data from the memory at a device-facing interface. Various examples may include a method including receiving data at a device-facing interface, writing the data to a memory, receiving a timing signal, and responsive to the timing signal, providing a data packet including the data at a network-facing interface. Related devices, systems and methods are also disclosed.

20 Claims, 9 Drawing Sheets

CIRCUIT AND TIMER FOR MEMORY

CROSS-REFERENCE TO RELATED APPLICATIONS

This application claims the benefit of the priority date of U.S. Provisional Patent Application No. 63/203,475, filed Jul. 23, 2021, and titled "ISOCHRONOUS OPERATIONS IN A NETWORK," the disclosure of which is incorporated herein in its entirety by reference.

FIELD

This description relates, generally, to a circuit and timer for memory. More specifically, some examples relate to a circuit and a timer for managing moving data into or out of memory, without limitation.

BACKGROUND

In order to transmit data in an Ethernet network, the data may need to be inserted in an Ethernet packet including a header and a frame-check sequence. To insert the data into the Ethernet packet, the data may be stored in a buffer after being generated (or received) and may be read from the buffer into the packet as the packet is being generated or transmitted. Additionally, to receive data in an Ethernet network, the data may need to be extracted from the Ethernet packet and stored in a buffer prior to being provided at an interface.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
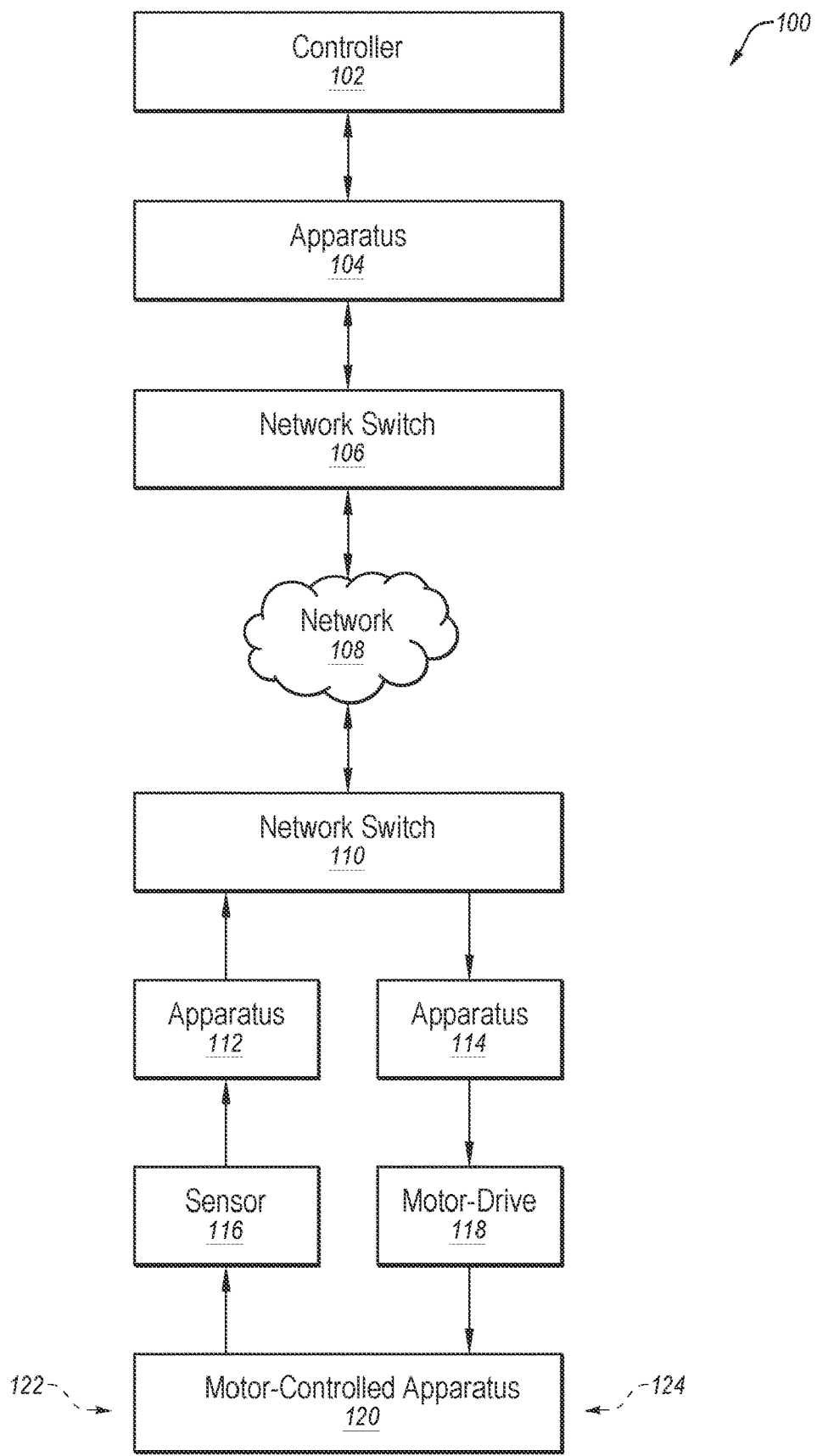
FIG. 1 is a functional block diagram illustrating a system according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Automation/control systems (e.g., industrial automation control systems, without limitation) are employed for controlling operation of, for example, processes or machines, and are typically adaptable to different control applications through configuration and interconnection of multiple control-system components (e.g., control modules, input/output (I/O) modules, and I/O devices, without limitation). Some control systems may include a processor running or executing a control program to interact with an I/O system (e.g., typically one or more I/O modules or devices, without limitation) to receive system information in the form of analog or digital inputs from sensors and to provide outputs (analog or digital) to one or more actuators (e.g., motors or motor-drives, without limitation). Control systems may be interconnected with management information and other systems in a manufacturing facility and may be operatively connected to any number of communication networks to facilitate various management functions (e.g., inventory control, accounting, and manufacturing control, without limitation) in addition to process/machine control functionality.

A desire to integrate business and control network structures to interconnect control systems with general purpose systems, along with the evolution and development of Ethernet (e.g., in switch mode with full duplex capability, without limitation), has allowed for Ethernet networks (e.g., such as Ethernet/Internet Protocol (IP) networks that allow for direct connection of field devices to an Ethernet network, without limitation) to be widely used in various applications (e.g., industrial applications, without limitation). As a non-limiting example, some industrial automation control systems use Ethernet networks to provide for communication between various components and controllers. Some Ethernet networks are capable of communicating data on the order of 100 million bits per second ("Mb/s"). Other Ethernet networks are capable of communicating data on the order of 1 billion bits per second ("Gb/s").

In order to transmit data in a network (e.g., an Ethernet network, without limitation), the data may need to be packetized (e.g., in an Ethernet packet, without limitation). A packet (e.g., an Ethernet packet, without limitation) may include, in order, a header (e.g., including a preamble, start-frame delimiter, destination address, source address, and a VLAD tag, without limitation), a payload (e.g., including the data, without limitation), and a frame-check sequence (e.g., a cyclic redundancy check ("CRC"), without limitation). The data may be stored in a buffer between the time when the data is generated and when the data is transmitted in the packet. Storing the data in the buffer may be a step in packetizing the data. Some examples may relate to managing timings of when the data is written to the buffer and/or when the data is read from the buffer and provided at the network-facing interface (in the packet).

In order to process data received via a network (e.g., an Ethernet network, without limitation), the data may need to be extracted from a packet (e.g., an Ethernet packet, without limitation). The data may be stored in a buffer between when the data is received in the packet and when the data is provided to the receiving device (e.g., stored in a memory accessible to receiving device or provided at an interface communicatively coupled to the receiving device, without limitation). Storing the data in the buffer may be a step in extracting the data from the packet. Some examples may relate to managing timings of when the data from the packet is written to the buffer and/or when the data is read from the buffer and provided at the device-facing interface.

Conventional devices (e.g., controllers, sensors, and/or actuators) in a network may require handshakes between a writer and a reader to ensure that data is not being read from a buffer at the same time data is being written to the buffer.

Various examples may manage timing of reading from and/or writing to buffers such that data can be read from a buffer soon after the data is done being written to the buffer. Such examples may ensure data is not read from the buffer while data is being written to the buffer. Further, such examples may allow reading from the buffer sooner than conventional devices because such examples may allow reading as soon as the data is done being written to the buffer. Allowing the data to be read sooner may improve a communication latency of devices operating in the network.

FIG. 1 is a functional block diagram illustrating a system 100 according to one or more examples. Communications within system 100 may be improved according to one or more examples. For example, latency of communications within system 100 may be reduced according to one or more examples.

System 100 may be an industrial automation control system. System 100 may include a controller 102, a sensor 116, a motor-drive 118, and a motor-controlled apparatus 120. Motor-controlled apparatus 120 may have an observed position 122 and a desired position 124. System 100 may include a network switch 106, a network 108, and a network switch 110. System 100 may include an apparatus 104, an apparatus 112, and an apparatus 114.

Controller 102 may cause a motor-controlled apparatus 120 to move from an observed position 122 towards a desired position 124 of motor-controlled apparatus 120. As a non-limiting example, controller 102 may receive sense data indicative of measurements from sensor 116. The sense data from sensor 116 may be indicative of observed position 122 of motor-controlled apparatus 120. Controller 102 may provide control data to motor-drive 118 to control operation of motor-drive 118. The control data may be responsive to the observed position 122. The control data may cause motor-drive 118 to operate to cause motor-controlled apparatus 120 to move towards desired position 124.

Controller 102 may be, or may include, any suitable logic or processor for controlling performance of operations in system 100. In some examples, controller 102 may be or may include a programmable logic controller (PLC) or a processor.

Sensor 116 may sense (or measure) one or more properties (alternatively referred to herein as "take a measurement"). Sensor 116 may generate sense data based on the sensed properties. Sensor 116 may transmit the sense data to controller 102 (e.g., through network 108, without limitation). Non-limiting examples of suitable sensors include: acoustic sensors, chemical sensors, electric sensors, magnetic sensors, radiation sensors, fluid sensors, position sensors, displacement sensors, speed sensors, optical sensors, pressure sensors, force sensors, weight sensors, thermal sensors, and combinations thereof. Sensor 116 may be an example of any of the suitable sensors listed, without limitation.

Motor-drive 118 is an example of an actuator. An actuator, (e.g., motor-drive 118, without limitation) may directly, or indirectly, move, electrically connect, or control a mechanism or system in response to control data. Actuators (including motor-drive 118) may optionally include sensors, such as sensor 116, to measure the movement, e.g., for a control loop, without limitation. Non-limiting examples of suitable actuators include: hydraulic actuators, pneumatic actuators, electric actuators, thermal actuators, magnetic actuators, motors or mechanical actuators. Motor-drive 118 may be an example of any of the suitable actuators listed, without limitation. Actuators may move or cause movement based on control data. For example, control data may include instructions regarding how much to move, how fast to move, how much force to apply, or how much current to apply and the actuators may move or cause movement responsive to the control data.

Motor-controlled apparatus 120 may be moved or controlled by motor-drive 118. Motor-controlled apparatus 120 may be capable of being moved from a first position to a second position (e.g., "desired position 124," without limitation). The observed position 122 of motor-controlled apparatus 120 may be sensed (e.g., observed or updated, without limitation) by sensor 116. Controller 102 may track observed position 122 of motor-controlled apparatus 120 until observed position 122 is the same as desired position 124. The description herein is in relation to causing motor-drive 118 to operate to cause motor-controlled apparatus 120 to move towards desired position 124 is not limiting in any way and is simply an example.

Network 108 may be, or may include, a communication network through which controller 102 can send control data to motor-drive 118 and receive sense data from sensor 116. Network 108 may include one or more switches, bridges, and network cables and the like. Network 108 may function according to Ethernet protocols, in other words, network 108 may be an Ethernet network, without limitation.

Network switch 106 and network switch 110 may be, or may include, any suitable switch for communicating in network 108. Network switch 106 and network switch 110 may be considered part of network 108.

Apparatus 104, apparatus 112, and apparatus 114 may (collectively or individually) enable improved latency of communications in system 100 according to one or more examples.

An Example of Sending Sense Data from Apparatus 112

As a non-limiting example, apparatus 112 may receive sense data from sensor 116 and packetize the sense data such that the sense data is included in a packet according to a suitable format for communicating on network 108. Apparatus 112 may then provide the packetized sense data to network switch 110.

In some non-limiting examples, apparatus 112 may be external to sensor 116 and may receive the sense data at a device-facing interface and thereafter provide packets to network switch 110 at a network-facing interface. In other non-limiting examples, apparatus 112 may be part of sensor 116 and may receive the sense data as it is sensed by sensor 116 and thereafter provide packets to network switch 110 at a network-facing interface.

In either case, apparatus 112 may store the sense data in a buffer for a time between when the sense data is generated by sensor 116 (or when the sense data is received at the device-facing interface) and when the sense data is provided, in a packet, to network switch 110 at the network-facing interface of apparatus 112. Storing the sense data in the buffer may be a step in the process of packetizing the sense data. Apparatus 112 may manage the timing of when the sense data is read from the buffer such that the sense data is read from the buffer (e.g., for packetizing) soon after (e.g., as soon as) the data is written to the buffer. This may improve the communication latency of apparatus 112, e.g., with respect to sending sense data of sensor 116.

An Example of Receiving Sense Data at Apparatus 104

Additionally or alternatively, apparatus 104 may receive a packet including sense data from network switch 106 (which sense data may have originated at sensor 116). Apparatus 104 may extract the sense data from the packet such that the sense data is in a suitable format for controller 102. Apparatus 104 may then provide the sense data to controller 102.

In some non-limiting examples, apparatus 104 may be separate from controller 102 and may receive the packetized sense data at a network-facing interface and thereafter provide the sense data to controller 102 at a device-facing interface. In other non-limiting examples, apparatus 104 may be part of the same system or device as controller 102 and may receive the packetized sense data at a network-facing interface and thereafter provide the sense data to a memory (e.g., a register, without limitation) of controller 102.

In either case, apparatus 104 may store the sense data in a buffer for a time between when the packet is received and when the sense data is provided to controller 102 (either at the device-facing interface or the memory of controller 102). Storing the sense data in the buffer may be a step in the process of extracting the sense data from the packet. Apparatus 104 may manage the timing of when the sense data is read from the buffer and provided to controller 102 (e.g., at a network-facing interface of controller 102, without limitation) such that the sense data is read from the buffer soon after (e.g., as soon as) the data is written to the buffer. This may improve the communication latency of controller, e.g., with respect to receiving sense data.

An Example of Sending Control Data from Apparatus 104

Additionally or alternatively, apparatus 104 may receive control data from controller 102 and provide the control data to motor-drive 118 (via network 108). Apparatus 104 may packetize the control data such that the control data is in a packet according to a suitable format for communicating on network 108.

In some non-limiting examples, apparatus 104 may be external to controller 102 and may receive the control data at a device-facing interface and thereafter provide packets to network switch 106 at a network-facing interface. In other non-limiting examples, apparatus 104 may be part of the same system or device as controller 102 and may receive the control data as it is generated by controller 102 and thereafter provide packets to network switch 106 at a network-facing interface.

In either case, apparatus 104 may store the control data in a buffer for a time between when the control data is generated (or when the control data is received at the device-facing interface) by controller 102 and when the control data is provided to network switch 106 at the network-facing interface in a packet. Storing the control data in the buffer may be a step in the process of packetizing the control data. Apparatus 104 may manage the timing of when the control data is read from the buffer such that the control data is read from the buffer soon after (e.g., as soon as) the data is written to the buffer. This may improve the communication latency of controller 102, e.g., with respect to sending control data.

An Example of Receiving Control Data at Apparatus 114

As another non-limiting example, apparatus 114 may receive a packet including control data from network switch 110 (which control data may have originated at controller 102). Apparatus 114 may extract the control data from the packet such that the control data is in a suitable format for motor-drive 118. Apparatus 114 may then provide the control data to motor-drive 118.

In some non-limiting examples, apparatus 114 may be external to motor-drive 118 and may receive the packetized control data at a network-facing interface and thereafter provide the control data to motor-drive 118 at a device-facing interface. In other non-limiting examples, apparatus 114 may be part of motor-drive 118 and may receive the packetized control data at a network-facing interface and thereafter provide the control data to a memory (e.g., a register, without limitation) accessible to motor-drive 118.

In either case, apparatus 114 may store the control data in a buffer for a time between when the control data is received and when the control data is provided to motor-drive 118 (either at the device-facing interface or the memory of motor-drive 118). Storing the control data in the buffer may be a step in the process of extracting the control data from the packet. Apparatus 114 may manage the timing of when the control data is read from the buffer such that the control data is read from the buffer soon after (e.g., as soon as) the data is written to the buffer. This may improve the communication latency of motor-drive 118, e.g., with regard to receiving control data.

In FIG. 1, apparatus 112 and apparatus 114 are illustrated and described as separate. In other examples, apparatus 112 and apparatus 114 may be combined into a single apparatus that may perform the operations described with regard to both apparatus 112 and apparatus 114. Further, apparatus 112, apparatus 114, or a combined apparatus 112/apparatus 114 (not illustrated in FIG. 1) may additionally improve latency of communications of additional sensors, actuators, or controllers (not illustrated in FIG. 1) within system 100.

In FIG. 1, one sensor 116 and one motor-drive 118 are illustrated for descriptive purposes. In other examples, system 100 may include any number of sensors, actuators, or controllers. Such example systems (including multiple sensors, actuators, or controllers) may include additional apparatuses that operate substantially the same as, or the same as, any of apparatus 104, apparatus 112 or apparatus 114. Additionally or alternatively, apparatus 104 may improve communications of all of the multiple sensors, actuators, or controllers.

Figure 2:
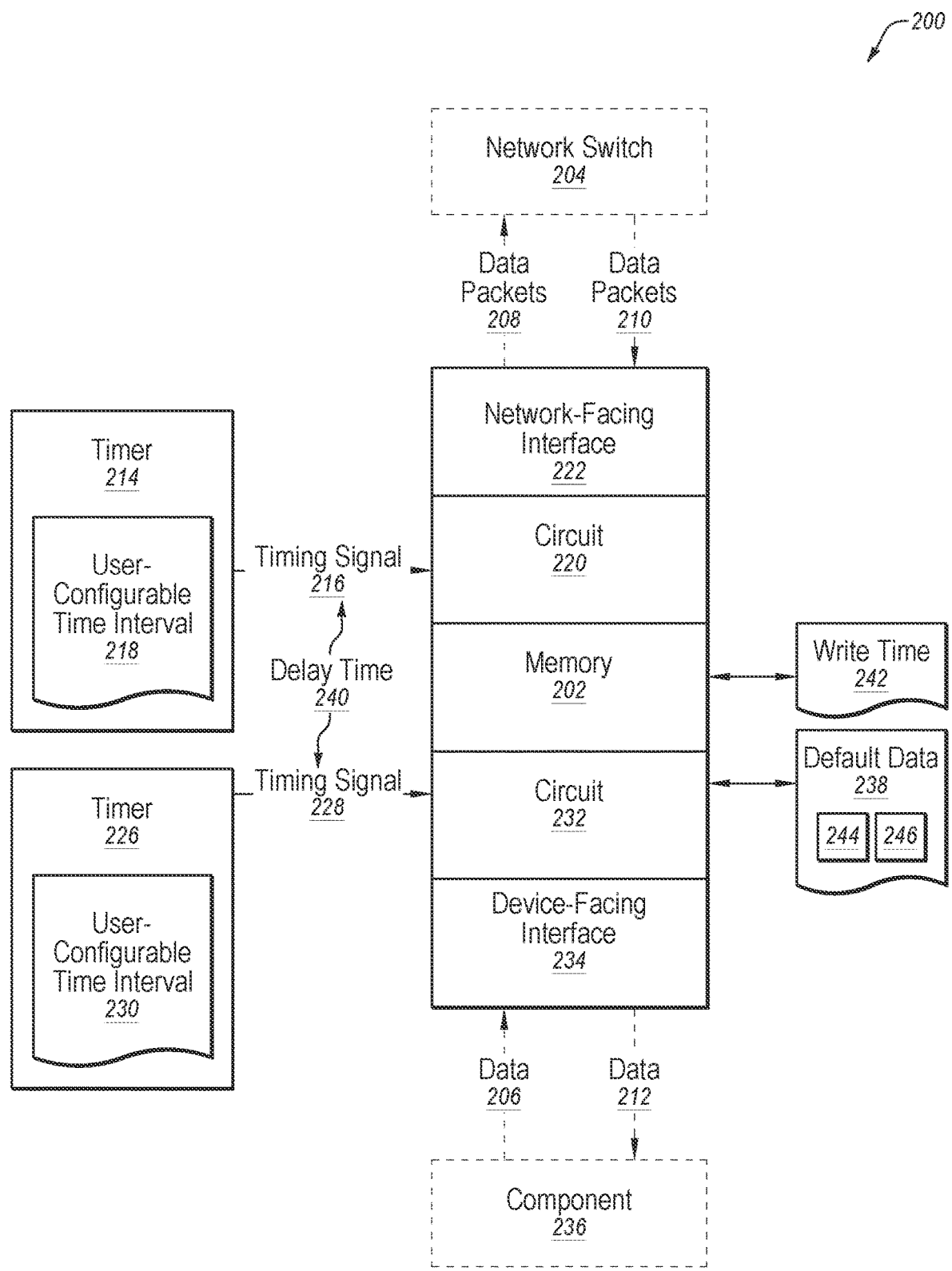
FIG. 2 is a functional block diagram illustrating an apparatus according to one or more examples.

FIG. 2 is a functional block diagram illustrating an apparatus 200 according to one or more examples. Apparatus 200 may improve a latency of a component 236, e.g., with regard to sending data 206 and/or receiving data 212.

Apparatus 200 may include a memory 202, a timer 214 (which timer 214 may be referred to alternatively herein as "network-side timer 214") (which timer 214 may generate a timing signal 216 (which timing signal 216 may be referred to alternatively herein as "network-side timing signal 216") and which timer 214 may store a user-configurable time interval 218 (which user-configurable time interval 218 may be referred to alternatively herein as "network-side user-configurable time interval 218")), a timer 226 (which timer 226 may be referred to alternatively herein as "device-side timer 214") (which timer 226 may generate a timing signal 228 (which timing signal 228 may be referred to alternatively herein as "device-side timing signal 228") and which timer 214 may store a user-configurable time interval 230 (which user-configurable time interval 230 may be referred to alternatively herein as "device-side user-configurable time interval 230")), a circuit 220 (which circuit 220 may be referred to alternatively herein as "network-side circuit 220"), a circuit 232 (which circuit 232 may be referred to alternatively herein as "device-side circuit 232"), a network-facing interface 222, and a device-facing interface 234. Apparatus 200 may store default data 238, and/or write time 242. According to operation of apparatus 200, there may be a delay time 240 between timing signal 216 and timing signal 228.

Apparatus 200 may communicate with network switch 204 and/or component 236, for example, by receiving data 206 from component 236, providing data packets 208 (including data 206) to network switch 204, receiving data packets 210 from network switch 204, and providing data 212 (which data 212 may have been included in data packets 208) to component 236. Network switch 204 or component 236 may or may not be part of part of apparatus 200. Thus, network switch 204 and component 236 are both optional in apparatus 200. The optionality of network switch 204 and component 236 in apparatus 200 is depicted in FIG. 2 by network switch 204 and component 236 being illustrated using dashed lines.

Apparatus 200 is an example of any of apparatus 104 of FIG. 1, apparatus 112 of FIG. 1, and apparatus 114 of FIG. 1. As a non-limiting example, apparatus 200 may be an example of apparatus 112, in which case component 236 may be an example of sensor 116 of FIG. 1 and network switch 204 may be an example of network switch 110 of FIG. 1. As another non-limiting example, apparatus 200 may be an example of apparatus 104, in which case component 236 may be an example of controller 102 of FIG. 1 and network switch 204 may be an example of network switch 106 of FIG. 1. As another non-limiting example, apparatus 200 may be an example of apparatus 114, in which case component 236 may be an example of motor-drive 118 of FIG. 1 and network switch 204 may be an example of network switch 110.

Either or both of circuit 220 and circuit 232 may be, or may include, any suitable circuits or logic to move data into or out of memory 202 responsive to timing signal 216 or timing signal 228. As a non-limiting example, either or both of circuit 220 and circuit 232 may be, or may include, an ASIC or an FPGA.

Memory 202 may be or may include any suitable device to store data. Random-access memory (RAM), is a non-limiting example of suitable memory. In the present disclosure, the terms "memory" and "buffer" may both refer to suitable devices to store data.

An Example of Managing Timing for Receiving Data and Generating Data Packets

An example of operations of apparatus 200 is given with regard to receiving data 206 at device-facing interface 234 and providing data packets 208 at network-facing interface 222. As a non-limiting example, apparatus 200 may receive data 206 (which data 206 may be sense data, for example, sense data received from a sensor or which data 206 may be control data received from a controller). In some non-limiting examples, data 206 may be received at a device-facing interface 234 as illustrated in FIG. 2. In other non-limiting examples, when apparatus 200 includes component 236, data 206 may be received by apparatus 200 as data 206 is generated or stored in a memory of component 236 that is accessible to apparatus 200.

Circuit 232 may write data 206 to memory 202 (e.g., circuit 232 may "move" data 206 to memory 202, without limitation). Memory 202 may be a buffer. Circuit 232 may write data 206 to memory 202 as part of packetizing data 206 into data packets 208. Circuit 232 may manage the timing of writing data 206 to memory 202. As a non-limiting example, circuit 232 may write data 206 into memory 202 responsive to timing signal 228. Timer 226 may generate timing signal 228 based on a user-configurable time interval 230. For example, timer 226 may generate timing signal 228 repeatedly following successive expirations of the user-configurable time interval 230.

In some non-limiting examples, (e.g., examples in which data 206 is sense data from a sensor to be provided in data packets 208 to a controller via a network, or examples in which data 206 is control data from a controller to be provided to an actuator via a network, without limitation) user-configurable time interval 230 may be according to periodic operation of component 236. For example, user-configurable time interval 230 may be based on a periodicity of the operation of component 236.

For example, component 236 may be an isochronously operating sensor or controller that may provide data 206 at a regular periodicity. User-configurable time interval 230 may be based on the regular periodicity. In such examples, circuit 232 may write data 206 into memory 202 according to the regular periodicity of component 236. As a non-limiting example, component 236 may operate isochronously at intervals of 10 ms. Circuit 232, according to the generation of timing signal 228 by timer 226 based on user-configurable time interval 230, may write data 206 into memory 202 every 10 ms. There is no requirement that timing signal 228 by synchronous with operation of component 236, e.g., there may be a phase difference between the timing of component 236 and timing signal 228.

Alternatively, in some non-limiting examples, circuit 232 may write data 206 to memory 202 when data 206 is received from component 236, e.g., not based on a timing signal. Such non-limiting examples may, or may not, include timer 226 and/or timing signal 228.

Continuing the example of operations of apparatus 200, circuit 220 may read data 206 from memory 202 and may provide data 206 at network-facing interface 222 in data packets 208 (e.g., circuit 220 may "move" data 206 from memory 202 to network-facing interface 222, without limitation). Circuit 220 may manage the timing of reading data 206 from memory 202 to provide data packets 208 at network-facing interface 222. As a non-limiting example, circuit 220 may read data 206 from memory 202 responsive to timing signal 216. Timer 214 may generate timing signal 216 based on a user-configurable time interval 218. For example, timer 214 may generate timing signal 216 repeatedly following successive expirations of the user-configurable time interval 218.

In some non-limiting examples (e.g., examples in which data 206 is sense data from a sensor to be provided in data packets 208 to a controller via the network, or examples in which data 206 is control data from a controller to be provided to an actuator via a network, without limitation), user-configurable time interval 218 may be according to a regular periodicity of component 236. In such examples, circuit 220 may read data 206 and provide data packets 208 at network-facing interface 222 according to the regular periodicity of component 236.

User-configurable time interval 218 may have a duration that is the same as user-configurable time interval 230. In other words, user-configurable time interval 218 may be the same as user-configurable time interval 230.

However, timing signal 216 may be generated delay time 240 after timing signal 228 is generated. As a non-limiting example, circuit 232 may write data 206 into memory 202 every 10 ms (according to timing signal 228), and circuit 220 may read data 206 from memory 202 every 10 ms (according to timing signal 216), but the times that circuit 220 reads data 206 from memory 202 may be after the times circuit 232 writes data 206 to memory 202 by delay time 240.

Timer 214 may operate independently of timer 226. For example, timer 214 and timer 226 may be synchronized but may be running independently. For example, timer 214 may generate timing signal 216 based on user-configurable time interval 218 without receiving timing signal 228.

Alternatively, e.g., in cases in which circuit 232 writes data 206 to memory 202 when data 206 is received and not according to timing signal 228, timer 214 may generate timing signal 216 according to an expected receive time of data 206. For example, timer 214 may generate timing signal 216 every 10 ms counting from a time at which it is expected that data 206 will have arrived at device-facing interface 234 plus delay time 240.

In some non-limiting examples, delay time 240 may be based on a duration of time that circuit 232 takes to write data 206 to memory 202, i.e., based on write time 242. In some non-limiting examples, delay time 240 may additionally include a buffer time, i.e., an additional time allowance to avoid potentially reading from memory 202 and writing to memory 202 at the same time. In other words, delay time 240 may additionally include a buffer time, i.e., an additional time allowance to avoid potentially reading data 206 from memory 202 prior to completion of writing data 206 to memory 202.

Generating timing signal 216 (and causing circuit 220 to read from memory 202) delay time 240 after circuit 232 begins writing data 206 to memory 202 causes data 206 to be read from memory 202 soon after, e.g., as soon as, data 206 has been written to memory 202. Thus timer 214 (e.g., timer 214 generating timing signal 216 delay time 240 after circuit 232 begins writing data 206 to memory 202) may result in a short latency. In some non-limiting examples, the latency of writing to memory 202 and reading from memory 202 may be as short as is possible, for example, by reading from memory 202 as soon as data has been written to memory 202. The short latency provided by apparatus 200 may allow apparatus 200 or component 236 to be integrated into an Ethernet network capable of communicating data at a high rate (e.g., 100 Mb/s or 1 Gb/s, without limitation). It is to be understood that circuit 220, in response to timing signal 216, may read data 206 from memory 202, prepare data packet 208 based on the read data 206, and send the data 206 as part of data packets 208.

An Example of Managing Timing for Receiving Data Packets and Providing Data

An example of operations of apparatus 200 is given with regard to receiving data packets 210 at network-facing interface 222 and providing data 212 at device-facing interface 234. As a non-limiting example, apparatus 200 may receive data packets 210 (which data packets 210 may include packetized sense data, for example, received from a sensor or which data packets 210 may include packetized control data received from a controller). In some non-limiting examples, data packets 210 may be received at a network-facing interface 222 as illustrated in FIG. 2.

Circuit 220 may write data 212 of data packets 210 to memory 202, e.g., as part of extracting data 212 from data packets 210, without limitation. Circuit 220 may manage the timing of writing data 212 to memory 202. As a non-limiting example, circuit 220 may write data 212 into memory 202 responsive to timing signal 216. Timer 214 may generate timing signal 216 based on a user-configurable time interval 218. For example, timer 214 may generate timing signal 216 repeatedly following successive expirations of the user-configurable time interval 218.

In some non-limiting examples, (including examples in which data packets 210 include control data from a controller to be provided as data 212 to an actuator or examples in which data packets include sense data from a sensor to be provided as data 212 to a controller, without limitation) user-configurable time interval 218 may be according to periodic operation of a device sending data packets 210. For example, user-configurable time interval 218 may be based on a regular periodicity of the operation of the device sending data packets 210.

For example, the device sending data packets 210 may be a synchronously operating sensor or controller that may provide data packets 210 at a regular periodicity. User-configurable time interval 218 may be based on the regular periodicity. As a non-limiting example, data packets 210 may be received from network switch 204 every 10 ms according to a regular periodicity of the device sending data packets 210. Circuit 220, according to the generation of timing signal 216 by timer 214 based on user-configurable time interval 218, may write data 212 into memory 202 every 10 ms.

Alternatively, in some non-limiting examples, circuit 220 may write data 212 to memory 202 when data packet 210 is received from network switch 204, e.g., not based on a timing signal.

Continuing the example of operations, of apparatus 200, circuit 232 may read data 212 from memory 202 and may provide data 212 at device-facing interface 234. Circuit 232 may manage the timing of reading data 212 from memory 202. As a non-limiting example, circuit 232 may read data 212 from memory 202 responsive to timing signal 228. Timer 226 may generate timing signal 228 based on a user-configurable time interval 230. For example, timer 226 may generate timing signal 228 repeatedly following successive expirations of the user-configurable time interval 230.

In some non-limiting examples, (including examples in which data packets 210 include control data from a controller to be provided as data 212 to component 236 and examples in which data packets include sense data from a sensor to be provided as data 212 to a controller) user-configurable time interval 230 may be according to the regular periodicity of the sender of data packets 210. In such examples, circuit 232 may read data 212 from memory 202 and provide data 212 to component 236 according to the regular periodicity of the sender of data packets 210.

For example, the sender of data packets 210 may be an isochronously operating sensor or controller that may provide data packets 210 at a regular periodicity. User-configurable time interval 230 may be based on the regular periodicity. In such examples, circuit 232 may read data 212 from memory 202 according to the regular periodicity of the sender of data packets 210. As a non-limiting example, the sender of data packets 210 may operate isochronously at intervals of 10 ms. Circuit 232, according to the generation of timing signal 228 by timer 226 based on user-configurable time interval 230, may read data 212 from memory 202 every 10 ms. Timing signal 228 may not be synchronous with operation of the sender of data packets 210, e.g., there may be a phase difference between the timing of the sender of data packets 210 and timing signal 228.

In some non-limiting examples, circuit 232 may provide default data 238 to component 236 as data 212 responsive to receiving timing signal 228 and not finding new data in memory 202. Default data 238 may include pre-specified data 244. Pre-specified data 244 may include, as a non-limiting example, null data, data that does not indicate a reading, or data that does not instruct an actuator to perform an operation. Additionally or alternatively, default data 238 may be related to previously provided data 246, e.g., "last good" data. As a non-limiting example, default data 238 may be an instance of data 206 that was previously provided or an average of one or more previously provided data samples.

User-configurable time interval 230 may have a duration that is the same as user-configurable time interval 218. In other words, user-configurable time interval 230 may be the same as user-configurable time interval 218.

However, timing signal 228 may be generated delay time 240 after timing signal 216 is generated. As a non-limiting example, circuit 220 may write data 212 into memory 202 every 10 ms (according to timing signal 216), and circuit 232 may read data 212 from memory 202 every 10 ms (according to timing signal 228), but the times that circuit 232 reads data 212 from memory 202 may be after the times circuit 220 writes data 212 to memory 202 by delay time 240.

Timer 226 may operate independently of timer 214. For example, timer 226 and timer 214 may be synchronized but may be running independently. For example, timer 226 may generate timing signal 228 based on user-configurable time interval 230 without receiving timing signal 216.

Alternatively, e.g., in cases in which circuit 220 writes data 212 to memory 202 when data packets 210 are received, e.g., not based on a timing signal, timer 226 may generate timing signal 228 according to an expected receive time of data packet 210. For example, timer 226 may generate timing signal 228 every 10 ms counting from a time at which it is expected that data packet 210 will have arrived at network-facing interface 222 plus delay time 240. Such non-limiting examples, may, or may not, include timer 214 and/or timing signal 216.

In some non-limiting examples, delay time 240 may be based on a duration of time that circuit 220 takes to write data 212 to memory 202, i.e., based on write time 242. In some non-limiting examples, delay time 240 may additionally include a buffer time, i.e., an additional time allowance to avoid potentially reading from memory 202 and writing to memory 202 at the same time. In other words, delay time 240 may additionally include a buffer time, i.e., an additional time allowance to avoid potentially reading data 212 from memory 202 prior to completion of writing data 212 to memory 202.

Generating timing signal 228 (and causing circuit 232 to read from memory 202) delay time 240 after circuit 220 begins writing data 212 to memory 202 causes data 212 to be read from memory 202 soon after, e.g., as soon as, data 212 has been written to memory 202. Thus timer 226 (e.g., timer 226 generating timing signal 228 delay time 240 after circuit 220 begins writing data 212 to memory 202) may result in a short latency. In some non-limiting examples, the latency of writing to memory 202 and reading from memory 202 may be as short as is possible, for example, by reading from memory 202 as soon as data has been written to memory 202. The short latency provided by apparatus 200 may allow apparatus 200 or component 236 to be integrated into an Ethernet network capable of communicating data at a high rate (e.g., 100 Mb/s or 1 Gb/s, without limitation).

Figure 3:
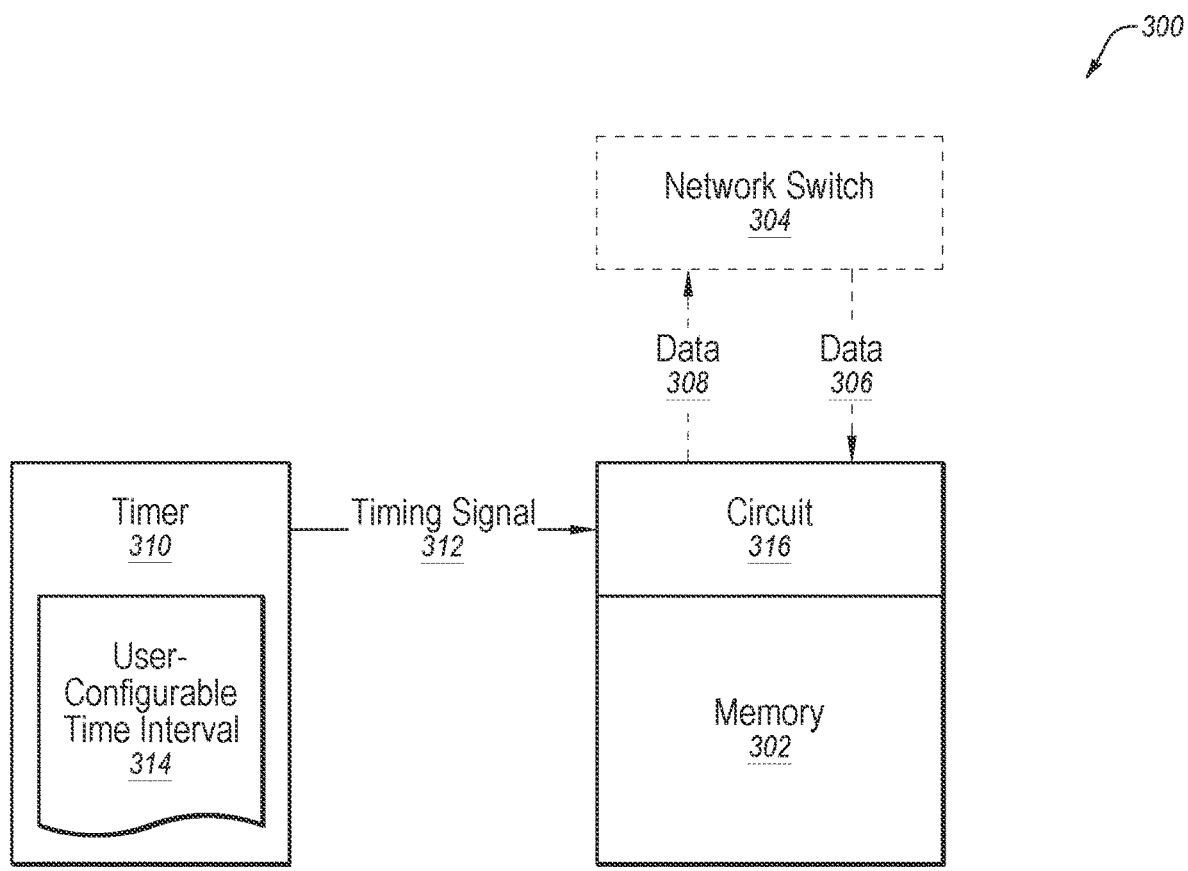
FIG. 3 is a functional block diagram illustrating an apparatus according to one or more examples.

FIG. 3 is a functional block diagram illustrating an apparatus 300 according to one or more examples. Apparatus 300 may, among other things, manage timing reading data from memory 302 to improve a latency of a device (not illustrated in FIG. 3), e.g., within an industrial automation control system, without limitation.

Apparatus 300 may include a memory 302 to store data 306 ingressing from a network switch 304 or data 308 egressing to network switch 304. Apparatus 300 may include a timer 310 to generate a timing signal 312 responsive to a user-configurable time interval 314. Apparatus 300 may include a circuit 316 to move the data to or from memory 302 (e.g., to move data 306 to memory 302 or to move data 308 from memory 302, without limitation) at least partially responsive to timing signal 312 generated by timer 310.

Apparatus 300 may be an example of apparatus 200 of FIG. 2 illustrated and described using a subset of the elements of apparatus 200. As a non-limiting example, memory 302 may be an example of memory 202 of FIG. 2. Network switch 304 may be an example of network switch 204 of FIG. 2. Data 306 may be an example of data packets 210 of FIG. 2. Data 308 may be an example of data packets 208 of FIG. 2. Timer 310 may be an example of timer 214 of FIG. 2 or timer 226 of FIG. 2. Timing signal 312 may be an example of timing signal 216 of FIG. 2 or timing signal 228 of FIG. 2. User-configurable time interval 314 may be an example of user-configurable time interval 218 of FIG. 2 or user-configurable time interval 230 of FIG. 2. Circuit 316 may be an example of circuit 220 of FIG. 2 or circuit 232 of FIG. 2. Similar to network switch 204 of FIG. 2, network switch 304 may be optional in apparatus 300. The optionality of network switch 304 in apparatus 300 is depicted in FIG. 3 by network switch 304 being illustrated using dashed lines.

As an example of contemplated operations, data 308 may be received by apparatus 300 from a component (not illustrated in FIG. 3). Data 308 may be sense data from a sensor or control data from a controller, without limitation. Data 308 may be written to memory 302 by a circuit (not illustrated in FIG. 3). Timer 310 may generate timing signal 312 a delay time after an expected receive time of data 308 at apparatus 300. Responsive to timing signal 312, circuit 316 may move data 308 from memory 302 into a data packet (including data 308) and may provide the data packet (including data 308) to the network switch.

As an alternative example of contemplated operations, a data packet (including data 306) may be received by apparatus 300 from network switch 304. Data 306 may be sense data from a sensor or control data from a controller, without limitation. Data 306 may be written to memory by a circuit (not illustrated in FIG. 3). Timer 310 may generate timing signal 312 a delay time after an expected receive time of the data packet (including data 306) at apparatus 300. Responsive to timing signal 312, circuit 316 may move data 306 from memory 302 onto an interface or memory accessible to a component (not illustrated in FIG. 3).

Figure 4:
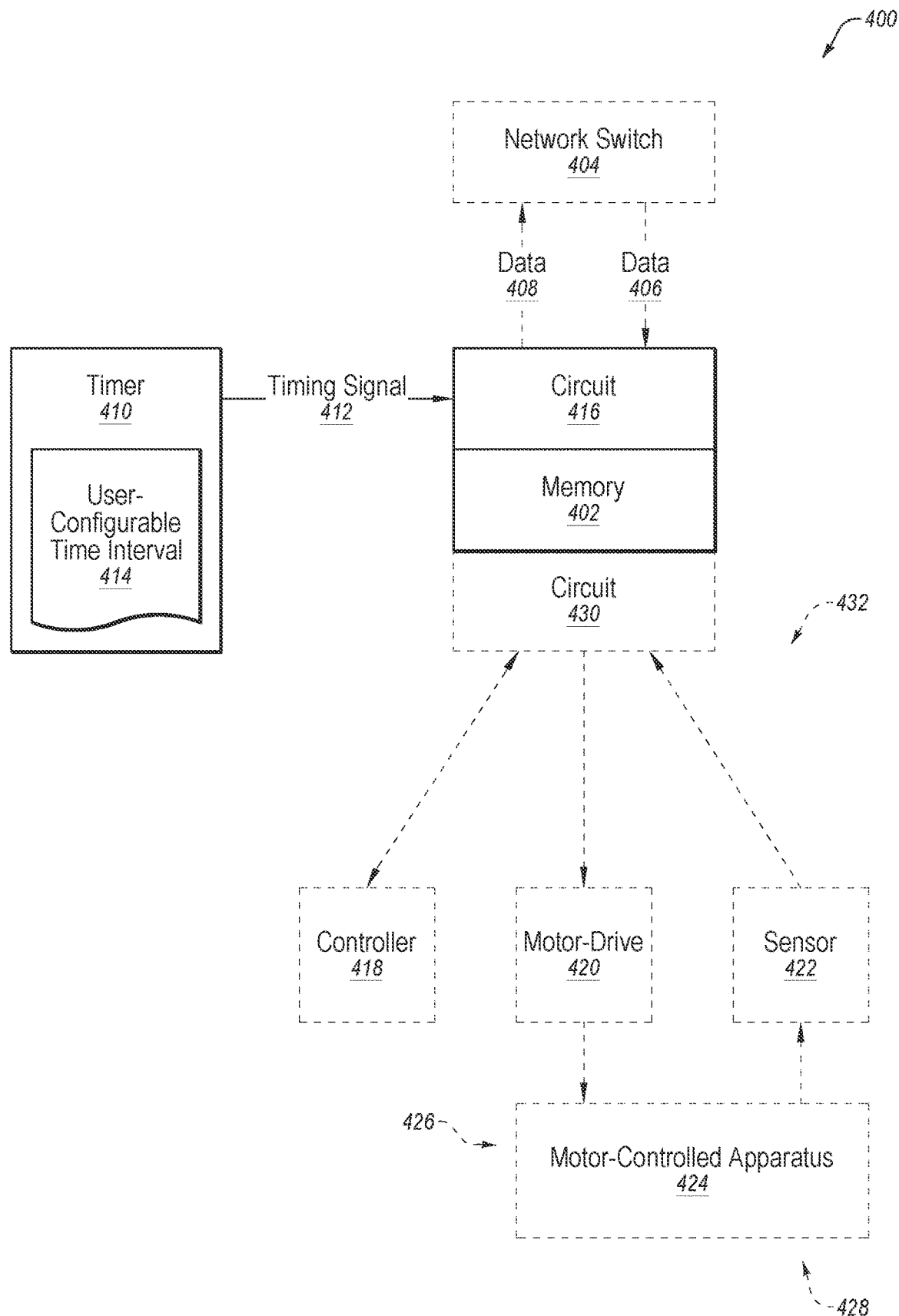
FIG. 4 is a functional block diagram illustrating an apparatus according to one or more examples.

FIG. 4 is a functional block diagram illustrating an apparatus 400 according to one or more examples. Apparatus 400 may, among other things, manage timing of writing data to a memory 402 or reading data from memory 402 to improve latency in communications between network switch 404 and any or all of controller 418, motor-drive 420, and sensor 422.

Apparatus 400 may include a network switch 404 to enable communication in industrial automation control system 432. Apparatus 400 may include memory 402 to store data 406 ingressing from network switch 404, or data 408 egressing to network switch 404. Apparatus 400 may include timer 410 to generate timing signal 412 responsive to user-configurable time interval 414. Apparatus 400 may include circuit 416 to move data 406 to memory 402 or to move data 408 from memory 402 at least partially responsive to timing signal 412 generated by timer 410.

Apparatus 400 may additionally include a circuit 430 to move data 408 (e.g., data received from one or more components, without limitation) to memory 402 and to provide data 406 to one or more components (e.g., at a device-facing interface (not illustrated in FIG. 4, without limitation)) at least partially responsive to an additional timing signal (not illustrated in FIG. 4) generated by an additional timer (not illustrated in FIG. 4). Circuit 430 is optional in apparatus 400. The optionality of circuit 430 in apparatus 400 is depicted in FIG. 4 by circuit 430 being illustrated using dashed lines.

Apparatus 400 may be an example of apparatus 200 of FIG. 2 illustrated and described using a subset of the elements of apparatus 200. As a non-limiting example, memory 402 may be an example of memory 202 of FIG. 2. Network switch 404 may be an example of network switch 204 of FIG. 2. Data 406 may be an example of data packets 210 of FIG. 2. Data 408 may be an example of data packets 208 of FIG. 2. Timer 410 may be an example of timer 214 of FIG. 2. Timing signal 412 may be an example of timing signal 216 of FIG. 2. User-configurable time interval 414 may be an example of user-configurable time interval 218 of FIG. 2. Circuit 416 may be an example of circuit 220 of FIG. 2. Circuit 430 may be an example of circuit 232 of FIG. 2. Additionally, controller 418 may be an example of controller 102 of FIG. 1. Motor-drive 420 may be an example of motor-drive 118 of FIG. 1. Sensor 422 may be an example of sensor 116 of FIG. 1. Motor-controlled apparatus 424 may be an example of motor-controlled apparatus 120 of FIG. 1.

In some non-limiting examples, industrial automation control system 432 may include components including controller 418, motor-drive 420, and sensor 422, all of which may be in communication via one or more instances of apparatus 400 and network switch 404 to perform a process for tracking an observed position 426 of a motor-controlled apparatus 424 to a desired position 428 of motor-controlled apparatus 424. All of industrial automation control system 432, controller 418, motor-drive 420, sensor 422, motor-controlled apparatus 424, observed position 426, and desired position 428 are optional. The optionality of industrial automation control system 432, controller 418, motor-drive 420, sensor 422, motor-controlled apparatus 424, observed position 426, and desired position 428 relative to apparatus 400 is depicted in FIG. 4 by each of industrial automation control system 432, controller 418, motor-drive 420, sensor 422, motor-controlled apparatus 424, observed position 426, and desired position 428 being illustrated using dashed lines.

As a non-limiting example, one or both of motor-drive 420 and sensor 422 may be directly communicatively coupled to apparatus 400 (which apparatus 400 may include network switch 404). Controller 418 may be communicatively coupled to network switch 404 via or one or more additional network switches (not illustrated in FIG. 4). Such an example of communicative coupling is illustrated by the communicative couplings between apparatus 112 of FIG. 1 or apparatus 114 of FIG. 1, and controller 102 of FIG. 1, sensor 116 of FIG. 1, and motor-drive 118 of FIG. 1.

As a non-limiting example, sensor 422 may generate sense data (e.g., data 408, without limitation) (which sense data may be indicative of observed position 426 of motor-controlled apparatus 424). Sensor 422 may provide the sense data to apparatus 400 (e.g., at a device-facing interface (not illustrated in FIG. 4, without limitation)). Apparatus 400 (using circuit 430, the additional timer, circuit 416, or timer 410) may manage timing of writing the sense data to memory 402 or the timing of reading the sense data from memory 402 for providing to network switch 404 in a packet. The packetized sense data may be provided to controller 418 via the network. Controller 418 may generate control data based on the sense data, e.g., to cause motor-drive 420 to move motor-controlled apparatus 424 to desired position 428, without limitation.

Controller 418 may provide the control data (e.g., data 406, without limitation) to apparatus 400 via the network. Apparatus 400 (using circuit 416, timer 410, circuit 430, the additional timer) may manage timing of writing the control data to memory 402 or the timing of reading the control data from memory 402 for providing to motor-drive 420. Motor-drive 420 may operate according to the control data which operations may cause motor-controlled apparatus 424 to move toward desired position 428.

As another non-limiting example, controller 418 may be directly communicatively coupled to apparatus 400 (including network switch 404). Motor-drive 420 and sensor 422 may be communicatively coupled to network switch 404 via or one or more additional network switches (not illustrated in FIG. 4). Such an example of communicative coupling is illustrated by the communicative couplings between apparatus 104 of FIG. 1, controller 102 of FIG. 1, sensor 116 of FIG. 1, and motor-drive 118 of FIG. 1.

Controller 418 may provide control data (e.g., data 408, without limitation) to apparatus 400. Apparatus 400 (using circuit 430, the additional timer, circuit 416, or timer 410) may manage timing of writing the control data to memory 402 or the timing of reading the control data from memory 402 for packetizing and for providing to network switch 404.

The packetized control data may then be transmitted to motor-drive 420 via a network (not illustrated in FIG. 4). Motor-drive 420 may operate according to the control data which operations may cause motor-controlled apparatus 424 to move toward desired position 428.

Continuing the example, sensor 422 may generate sense data (e.g., data 406, without limitation) (which sense data may be indicative of observed position 426 of motor-controlled apparatus 424). Sensor 422 may provide the sense data (e.g., packetized, without limitation) to network switch 404 via a network. Apparatus 400 (using circuit 416, timer 410, circuit 430, and or the additional timer) may manage timing of writing the sense data to memory 402 or the timing of reading the sense data from memory 402 for providing to controller 418. Controller 418 may generate additional control data based on the sense data, e.g., to cause motor-drive 420 to move motor-controlled apparatus 424 to desired position 428, without limitation.

Figure 5:
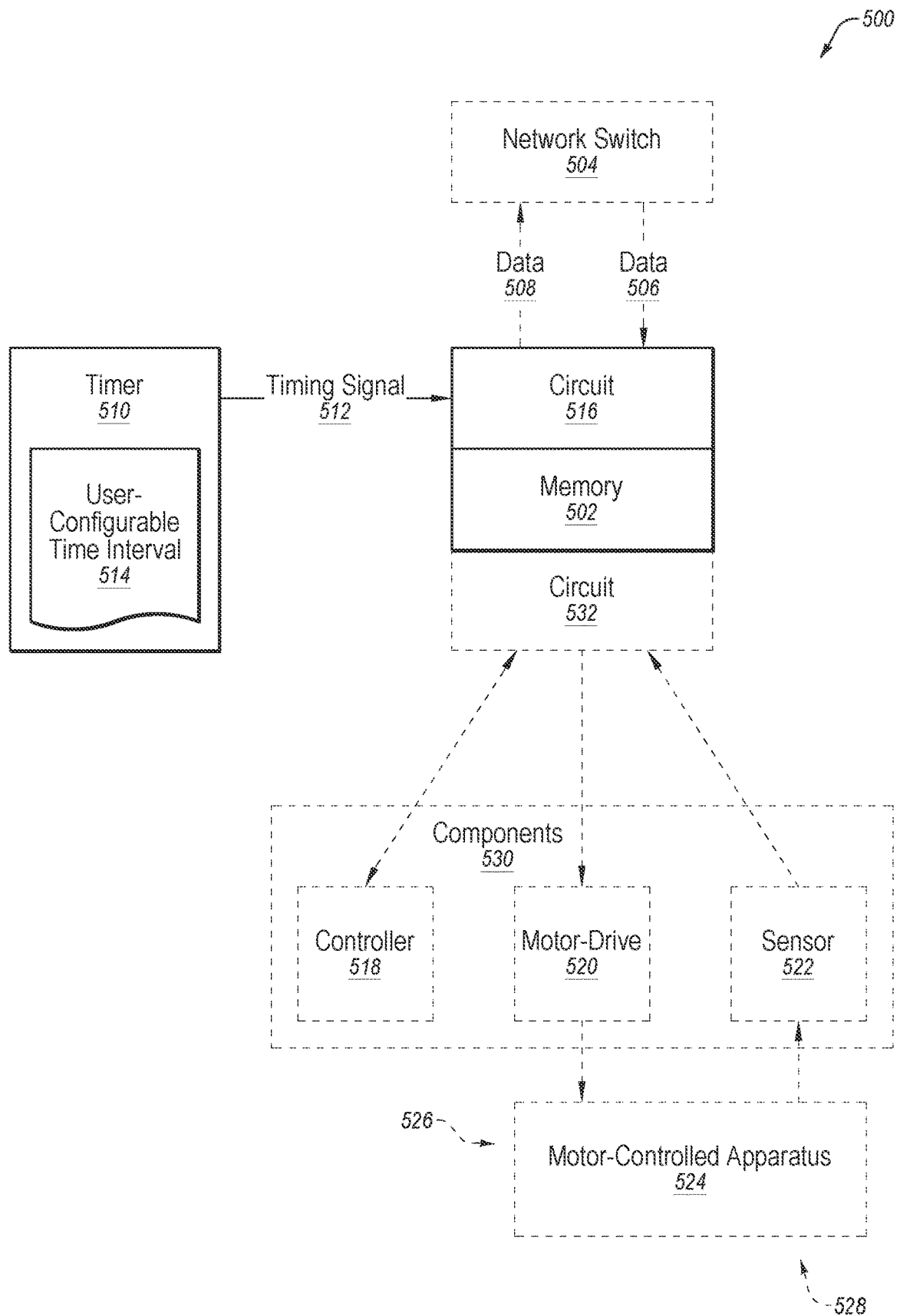
FIG. 5 is a functional block diagram illustrating a system according to one or more examples.

FIG. 5 is a functional block diagram illustrating a system 500 according to one or more examples. System 500 may, among other things, manage timing of writing data to a memory 502 or reading data from memory 502 to improve latency in communications between network switch 504 and any or all of controller 518, motor-drive 520, and sensor 522.

System 500 may be an industrial automation control system. System 500 may include one or more components 530. Components 530 include a controller 518, a motor-drive 520, and a sensor 522. Components 530 may be in communication with the others of components 530 or with further components of system 500 via a network switch 504. System 500 may include a memory 502 arranged to store data 506 ingressing to one or more of the components 530 from the network switch 504 or data 508 egressing from one or more of the components 530 to the network switch 504. System 500 may include a timer 510 to generate a timing signal 512 responsive to a user-configurable time interval 514. System 500 may include a circuit 516 to move data 506 to memory 502 or data 508 from memory 502 at least partially responsive to timing signal 512 generated by timer 510.

System 500 may additionally include a circuit 532 to move data 508 (e.g., data received from one or more of components 530, without limitation) to memory 502 and to provide data 506 to one or more of components 530 (e.g., at a device-facing interface (not illustrated in FIG. 5), without limitation) at least partially responsive to an additional timing signal (not illustrated in FIG. 5) generated by an additional timer (not illustrated in FIG. 5). Circuit 532 is optional in system 500. The optionality of circuit 532 in system 500 is depicted in FIG. 5 by circuit 532 being illustrated using dashed lines.

System 500 may include an example of apparatus 200 of FIG. 2 illustrated and described using a subset of the elements of apparatus 200. As a non-limiting example, memory 502 may be an example of memory 202 of FIG. 2. Network switch 504 may be an example of network switch 204 of FIG. 2. Data 506 may be an example of data packets 210 of FIG. 2. Data 508 may be an example of data packets 208 of FIG. 2. Timer 510 may be an example of timer 214 of FIG. 2. Timing signal 512 may be an example of timing signal 216 of FIG. 2. User-configurable time interval 514 may be an example of user-configurable time interval 218 of FIG. 2. Circuit 516 may be an example of circuit 220 of FIG. 2. Circuit 532 may be an example of circuit 232 of FIG. 2. Additionally, controller 518 may be an example of controller 102 of FIG. 1. Motor-drive 520 may be an example of motor-drive 118 of FIG. 1. Sensor 522 may be an example of sensor 116 of FIG. 1. Motor-controlled apparatus 524 may be an example of motor-controlled apparatus 120 of FIG. 1.

In some non-limiting examples, components 530 may include two or more of controller 518, motor-drive 520, and sensor 522, all of which may be in communication via one or more instances of an apparatus (e.g., apparatus 200 of FIG. 2) and network switch 504 to perform a process for tracking an observed position 526 of a motor-controlled apparatus 524 to a desired position 528 of motor-controlled apparatus 524. All but one of components 530 (e.g., controller 518, motor-drive 520, and sensor 522, without limitation), motor-controlled apparatus 524, observed position 526, and desired position 528 are optional in system 500. The optionality of all but one of components 530 (e.g., controller 518, motor-drive 520, and sensor 522, without limitation), motor-controlled apparatus 524, observed position 526, and desired position 528 is depicted in FIG. 5 by each of components 530, controller 518, motor-drive 520, sensor 522, motor-controlled apparatus 524, observed position 526, and desired position 528 being illustrated using dashed lines.

Similar to network switch 204 of FIG. 2 and network switch 304 of FIG. 3, network switch 504 may be optional in system 500. The optionality of network switch 504 in system 500 is depicted in FIG. 5 by network switch 504 being illustrated using dashed lines.

Figure 6:
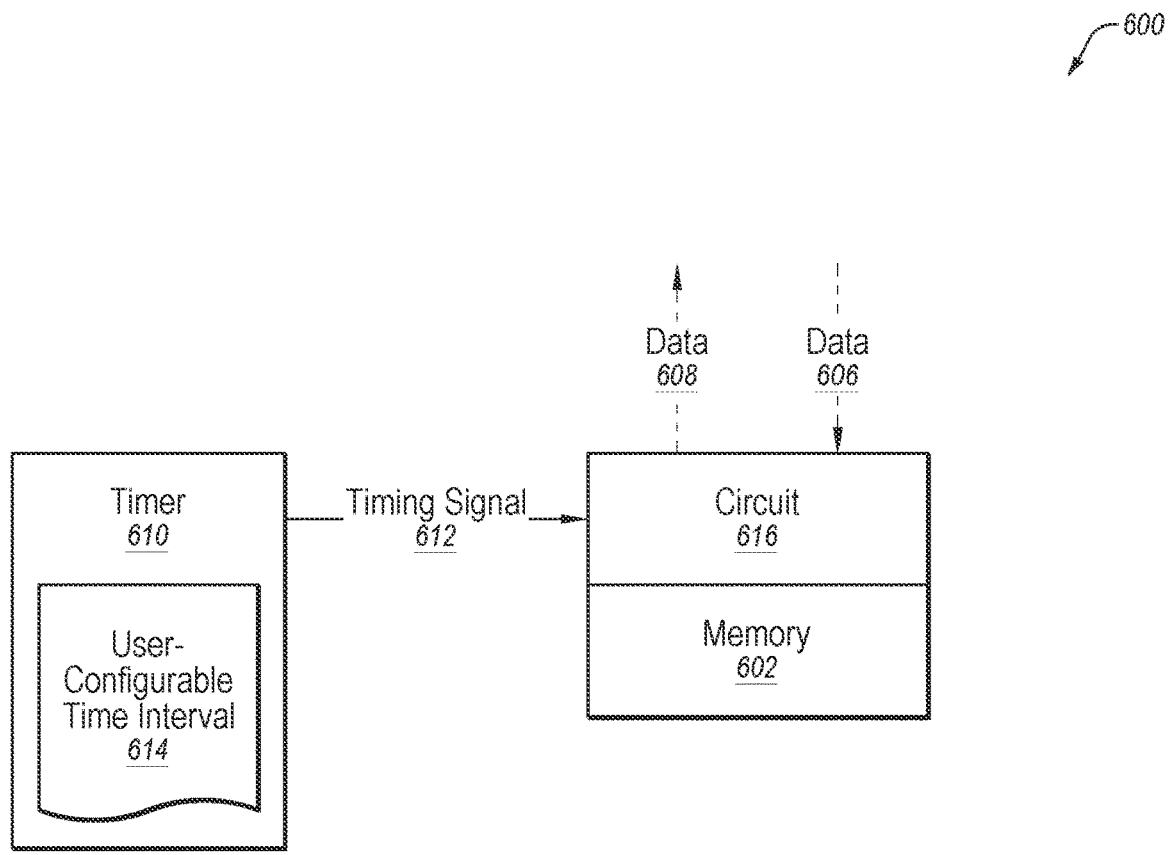
FIG. 6 is a functional block diagram illustrating an apparatus according to one or more examples.

FIG. 6 is a functional block diagram illustrating an apparatus 600 according to one or more examples. Apparatus 600 may include a memory 602 to store data 606 ingressing to apparatus 600, or data 608 egressing from apparatus 600, e.g., to/from a network switch (not illustrated in FIG. 6). Apparatus 600 may include a timer 610 to generate a timing signal 612 responsive to a user-configurable time interval 614. Apparatus 600 may include a circuit 616 to move ingressing data 606 to memory 602 or to move egressing data 608 from memory 602, at least partially responsive to timing signal 612 generated by timer 610.

Figure 7:
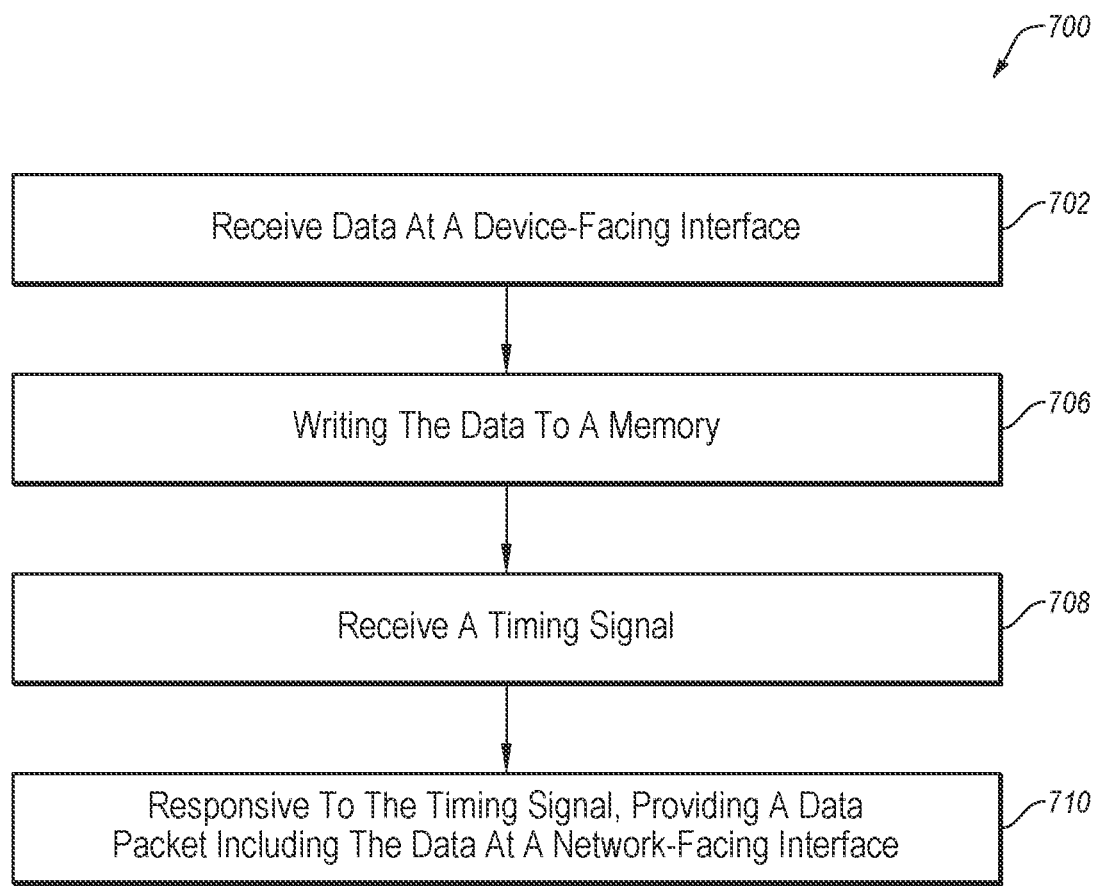
FIG. 7 is a flowchart of a method, in accordance with one or more examples.

FIG. 7 is a flowchart of method 700, in accordance with one or more examples. At least a portion of method 700 may be performed, in some examples, by a device or system, such as system 100 of FIG. 1, apparatus 104 of FIG. 1, apparatus 112 of FIG. 1, apparatus 114 of FIG. 1, apparatus 200 of FIG. 2, apparatus 300 of FIG. 3, apparatus 400 of FIG. 4, system 500 of FIG. 5, apparatus 600 of FIG. 6, or another device or system. Although illustrated as discrete blocks, various blocks may be divided into additional blocks, combined into fewer blocks, or eliminated, depending on the desired implementation.

In operation 702, data may be received at a device-facing interface. Data 206 of FIG. 2 may be an example of the data received at operation 702. Device-facing interface 234 of FIG. 2 may be an example of the device-facing interface at which the data is received at operation 702. The data may be, or may include, sense data, for example, generated by a sensor. Alternatively, the data may be, or may include, control data, e.g., generated by a controller, without limitation.

In operation 706, the data may be written to a memory. Data 206 of FIG. 2 may be an example of data written into the memory at operation 706. Memory 202 of FIG. 2 may be an example of the memory into which the data is written at operation 706. The data may be written to the memory by a circuit, e.g., circuit 232 of FIG. 2.

In operation 708, a timing signal may be received. Timing signal 216 of FIG. 2 may be an example of the timing signal received at operation 708. The timing signal may have been generated by a timer (e.g., timer 214 of FIG. 2, without limitation) based on a user-configurable time interval (e.g., user-configurable time interval 218 of FIG. 2, without limitation). The user-configurable time interval may be related to a regular periodicity of a device at the device-facing interface, e.g., a controller or sensor.

The timing signal may be received a delay time after an expected receive time of the data at the device-facing interface. The delay time may relate to a write time of the memory. As a non-limiting example, the delay time may be based on a time duration that it may take a circuit to write the data to the memory. Some examples may include generating the timing signal a delay time after the expected receive time of the data packet at the device-facing interface.

In operation 710, responsive to the timing signal, a data packet including the data may be provided at a network-facing interface. One or more of data packets 208 of FIG. 2 may be an example of the data packets provided at the network-facing interface at operation 710. Network-facing interface 222 of FIG. 2 may be an example of the network-facing interface at which the data packet is provided at operation 710. The data packet may include sense data, for example, generated by a sensor and provided to a controller via a network or the data packet may include control data, e.g., generated by a controller and intended for an actuator via the network, without limitation.

Figure 8:
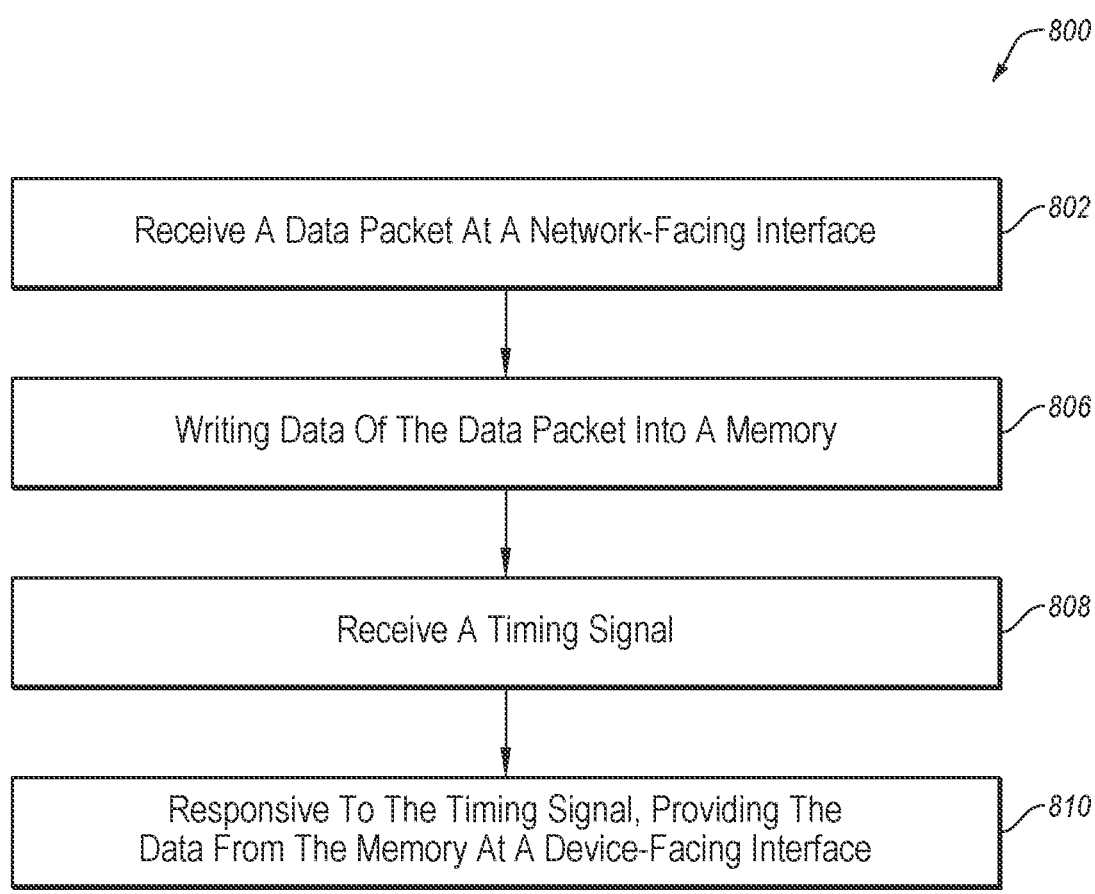
FIG. 8 is a flowchart of another method, in accordance with one or more examples.

FIG. 8 is a flowchart of another method 800, in accordance with one or more examples. At least a portion of method 800 may be performed, in some examples, by a device or system, such as system 100 of FIG. 1, apparatus 104 of FIG. 1, apparatus 112 of FIG. 1, apparatus 114 of FIG. 1, apparatus 200 of FIG. 2, apparatus 300 of FIG. 3, apparatus 400 of FIG. 4, system 500 of FIG. 5, apparatus 600 of FIG. 6, or another device or system. Although illustrated as discrete blocks, various blocks may be divided into additional blocks, combined into fewer blocks, or eliminated, depending on the desired implementation.

At operation 802, a data packet may be received at a network-facing interface. One or more of data packets 210 of FIG. 2 may be an example of the data packet received at operation 802. Network-facing interface 222 of FIG. 2 may be an example of the network-facing interface at which the data packet is received at operation 802. The data packet may have been transmitted across a network (e.g., network 108 of FIG. 1, without limitation) to a networks switch (e.g., network switch 204 of FIG. 2, without limitation) communicatively coupled to the network-facing interface. The data packet may include sense data, for example, generated by a sensor alternatively, the data packet may include control data, e.g., generated by a controller and intended for an actuator, without limitation.

At operation 806, data of the data packet may be written into a memory. Data 212 of FIG. 2 may be an example of data written into the memory at operation 806. Memory 202 of FIG. 2 may be an example of the memory into which the data is written at operation 806. The data may be written to the memory by a circuit, e.g., circuit 220 of FIG. 2.

At operation 808, a timing signal may be received. Timing signal 228 of FIG. 2 may be an example of the timing signal received at operation 808. The timing signal may have been generated by a timer (e.g., timer 226 of FIG. 2, without limitation) based on a user-configurable time interval (e.g., user-configurable time interval 230 of FIG. 2, without limitation). The user-configurable time interval may be related to a regular periodicity of a device which sent the data packet, e.g., a sensor or a controller.

The timing signal may be received a delay time after an expected receive time of data packet. The delay time may relate to a write time of the memory. As a non-limiting example, the delay time may be based on a time duration that it may take a circuit to write the data to the memory. Some examples may include generating the timing signal a delay time after an expected receive time of the data packet at the network-facing interface.

At operation 810, responsive to the timing signal, the data may be provided from the memory at a device-facing interface. Data 212 of FIG. 2 may be an example of the data provided at the device-facing interface at operation 810. Device-facing interface 234 of FIG. 2 may be an example of the device-facing interface at which the data is provided at operation 810. The data may be, or may include, sense data, for example, generated by a sensor and provided to a controller at the device-facing interface or the data may be, or may include, control data, e.g., generated by a controller and provided to an actuator at the device-facing interface, without limitation.

Modifications, additions, or omissions may be made to method 700 and/or method 800 without departing from the scope of the present disclosure. For example, the operations of method 700 and/or method 800 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 9:
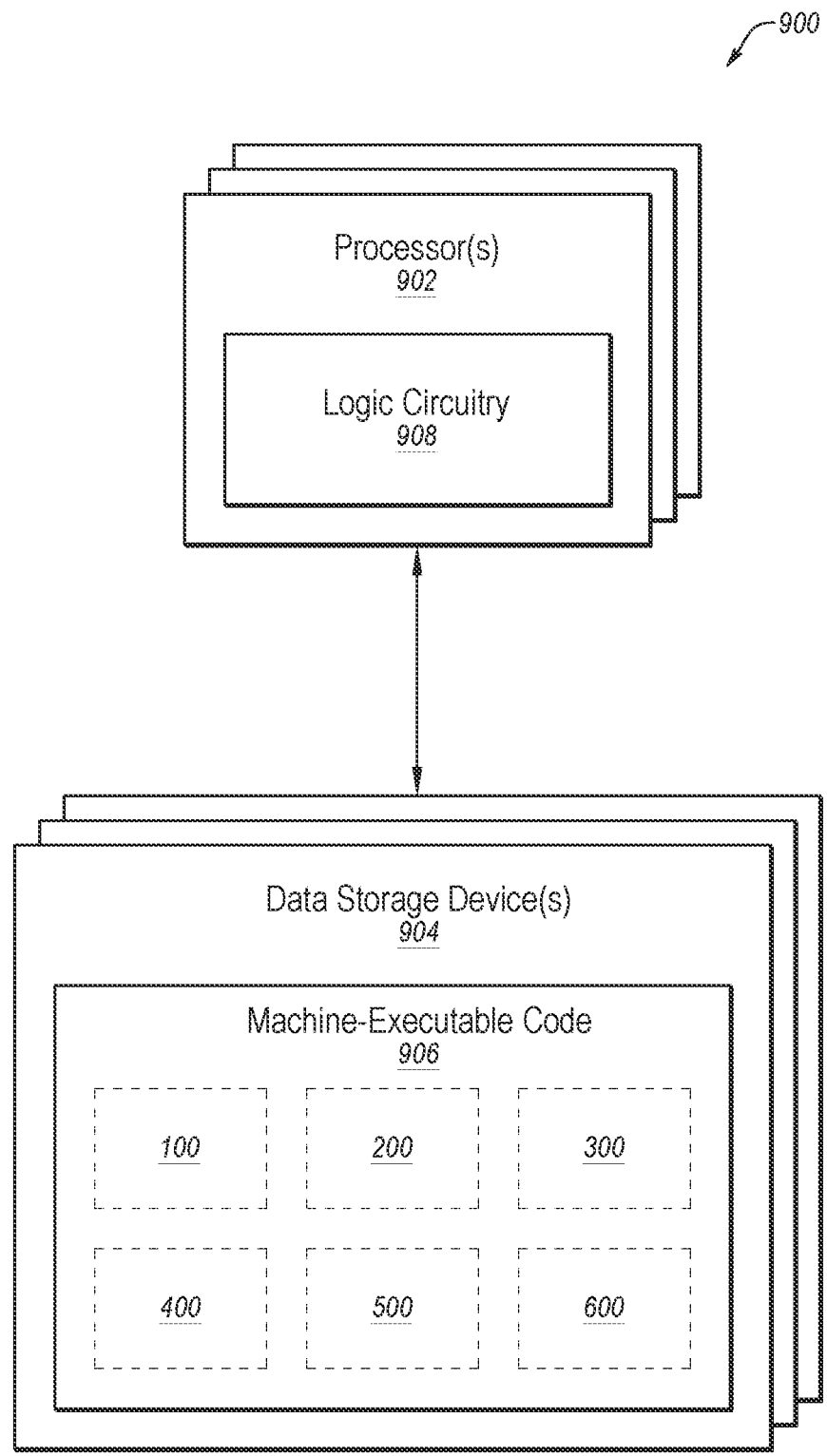
FIG. 9 illustrates a block diagram of a device that may be used to implement various functions, operations, acts, processes, or methods, in accordance with one or more examples.

FIG. 9 is a block diagram of a device 900 that, in one or more examples, may be used to implement various functions, operations, acts, processes, or methods disclosed herein. Device 900 includes one or more processors 902 (sometimes referred to herein as "processors 902") operably coupled to one or more apparatuses such as data storage devices (sometimes referred to herein as "storage 904"), without limitation. Storage 904 includes machine-executable code 906 stored thereon (e.g., stored on a computer-readable memory, without limitation) and processors 902 include logic circuitry 908. Machine-executable code 906 include information describing functional elements that may be implemented by (e.g., performed by, without limitation) logic circuitry 908. Logic circuitry 908 implements (e.g., performs, without limitation) the functional elements described by machine-executable code 906. Device 900, when executing the functional elements described by machine-executable code 906, should be considered as special purpose hardware may carry out the functional elements disclosed herein. In one or more examples, processors 902 may perform the functional elements described by machine-executable code 906 sequentially, concurrently (e.g., on one or more different hardware platforms, without limitation), or in one or more parallel process streams.

When implemented by logic circuitry 908 of processors 902, machine-executable code 906 may adapt processors 902 to perform operations of examples disclosed herein. For example, machine-executable code 906 may adapt processors 902 to perform at least a portion or a totality of method 700 of FIG. 7 or method 800 of FIG. 8. As another example, machine-executable code 906 may adapt processors 902 to perform at least a portion or a totality of the operations discussed with regard to system 100 of FIG. 1, apparatus 104 of FIG. 1, apparatus 112 of FIG. 1, apparatus 114 of FIG. 1, apparatus 200 of FIG. 2, apparatus 300 of FIG. 3, apparatus 400 of FIG. 4, system 500 of FIG. 5, or apparatus 600 of FIG. 6.

Processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 902 may include any conventional processor, controller, microcontroller, or state machine. Processors 902 may also be implemented as a combination of computing devices, such as a combination of a DSP and a microprocessor, a plurality of microprocessors, one or more microprocessors in conjunction with a DSP core, or any other such configuration.

In one or more examples, storage 904 includes volatile data storage (e.g., random-access memory (RAM), without limitation), non-volatile data storage (e.g., Flash memory, a hard disc drive, a solid-state drive, erasable programmable read-only memory (EPROM), without limitation). In one or more examples, processors 902 and storage 904 may be implemented into a single device (e.g., a semiconductor device product, a system on chip (SOC), without limitation). In one or more examples, processors 902 and storage 904 may be implemented into separate devices.

In one or more examples, machine-executable code 906 may include computer-readable instructions (e.g., software code, firmware code, without limitation). By way of non-limiting example, the computer-readable instructions may be stored by storage 904, accessed directly by processors 902, and executed by processors 902 using at least logic circuitry 908. Additionally, by way of non-limiting example, the computer-readable instructions may be stored on storage 904, transmitted to a memory device (not shown) for execution, and executed by processors 902 using at least logic circuitry 908. Accordingly, in one or more examples logic circuitry 908 includes electrically configurable logic circuitry.

In one or more examples, machine-executable code 906 may describe hardware (e.g., circuitry, without limitation) to be implemented in logic circuitry 908 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples, machine-executable code 906 may include an HDL, an RTL, a GL description, a mask level description, other hardware description, or any combination thereof.

In examples where machine-executable code 906 includes a hardware description (at any level of abstraction), a system (not shown, but including storage 904) may implement the hardware description described by machine-executable code 906. By way of non-limiting example, processors 902 may include a programmable logic device (e.g., an FPGA or a PLC, without limitation) and the logic circuitry 908 may be electrically controlled to implement circuitry corresponding to the hardware description into logic circuitry 908. Additionally, by way of non-limiting example, logic circuitry 908 may include hard-wired logic manufactured by a manufacturing system (not shown but including storage 904) according to the hardware description of machine-executable code 906.

Regardless of whether machine-executable code 906 includes computer-readable instructions or a hardware description, logic circuitry 908 performs the functional elements described by machine-executable code 906 when implementing the functional elements of machine-executable code 906. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general, such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus, comprising: a memory to store ingressing data or egressing data; a timer to generate a timing signal responsive to a user-configurable time interval; and a circuit to move the ingressing data or the egressing data from the memory at least partially responsive to the timing signal generated by the timer.

Example 2: The apparatus according to Example 1, wherein the ingressing data is received at a network-facing interface and wherein the circuit is to move the ingressing data from the memory to a device-facing interface.

Example 3: The apparatus according to any of Examples 1 and 2, wherein the circuit is to provide default data responsive to receiving the timing signal and not finding new data in the memory, wherein the default data comprises one or more of pre-specified data and previously received data.

Example 4: The apparatus according to any of Examples 1 through 3, wherein the circuit comprises a device-side circuit, and wherein the apparatus comprises: a network-side circuit to move the ingressing data from the network-facing interface to the memory.

Example 5: The apparatus according to any of Examples 1 through 4, wherein the timer is to generate the timing signal a delay time after an expected reception time of the ingressing data at the network-facing interface, the delay time related to a write time for writing the data to the memory.

Example 6: The apparatus according to any of Examples 1 through 5, wherein the device-facing interface is to be communicatively coupled to a controller of an industrial automation control system, the controller in communication, via a network switch, with a sensor and a motor-drive to move an observed position of a motor-controlled apparatus towards a desired position of the motor-controlled apparatus.

Example 7: The apparatus according to any of Examples 1 through 6, wherein the device-facing interface is to be communicatively coupled to one or more of a sensor and a motor-drive, both the sensor and the motor-drive in communication, via a network switch, with a controller of an industrial automation control system to move an observed position of a motor-controlled apparatus to a desired position of the motor-controlled apparatus.

Example 8: The apparatus according to any of Examples 1 through 7, wherein the egressing data is received at a device-facing interface, wherein the circuit is to move the egressing data from the memory to a network-facing interface.

Example 9: The apparatus according to any of Examples 1 through 8, wherein the timer comprises a network-side timer, wherein the timing signal comprises a network-side timing signal, wherein the user-configurable time interval comprises a network-side user-configurable time interval, wherein the circuit comprises a network-side circuit, and wherein the apparatus comprises: a device-side timer to generate a device-side timing signal; and a device-side circuit to move the egressing data from the device-facing interface to the memory least partially responsive to the device-side timing signal.

Example 10. The apparatus according to any of Examples 1 through 9, wherein the network-side timer is to generate the network-side timing signal a delay time after the device-side timer generates the device-side timing signal, the delay time related to a write time for writing the data to the memory.

Example 11: The apparatus according to any of Examples 1 through 10, wherein the circuit comprises a network-side circuit, and wherein the apparatus comprises: a device-side circuit to move the egressing data from the device-facing interface to the memory.

Example 12: The apparatus according to any of Examples 1 through 11, wherein the timer is to generate the timing signal a delay time after an expected reception time of the egressing data at the device-facing interface, the delay time related to a write time for writing the data to the memory.

Example 13: An apparatus comprising: a network switch to enable communication in an industrial automation control system; a memory to store data ingressing from, or egressing to, the network switch; a timer to generate a timing signal responsive to a user-configurable time interval; and a circuit to move the data to, or from, the memory at least partially responsive to the timing signal generated by the timer.

Example 14: The apparatus according to Example 13, wherein the industrial automation control system comprises a controller, a motor-drive, and a sensor in communication via the network switch to move an observed position of a motor-controlled apparatus towards a desired position of the motor-controlled apparatus.

Example 15: A system, comprising: a component of an industrial automation control system, the component comprising one or more of a controller, a motor-drive, and a sensor, the component in communication with further components of the industrial automation control system via a network switch; a memory arranged to store data ingressing to the component from the network switch or data egressing from the component to the network switch; a timer to generate a timing signal responsive to a user-configurable time interval; and a circuit to move the data to, or from, the memory at least partially responsive to the timing signal generated by the timer.

Example 16: The system according to Example 15, wherein the further components of the industrial automation control system comprise: two or more of a controller, a motor-drive, and a sensor in communication via the network switch to move an observed position of a motor-controlled apparatus towards a desired position of the motor-controlled apparatus.

Example 17: A method comprising: receiving a data packet at a network-facing interface; writing data of the data packet into a memory; receiving a timing signal; and responsive to the timing signal, providing the data from the memory at a device-facing interface.

Example 18: The method according to Example 17, comprising generating the timing signal a delay time after an expected receive time of the data packet at the network-facing interface, the delay time related to a write time for writing the data to the memory.

Example 19: A method comprising: receiving data at a device-facing interface; writing the data to a memory; receiving a timing signal; and responsive to the timing signal, providing a data packet including the data at a network-facing interface.

Example 20: The method according to Example 19, comprising generating the timing signal a delay time after an expected receive time of the data at the device-facing interface, the delay time related to a write time for writing the data to the memory.

While the present disclosure has been described with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
 a memory to store ingressing data or egressing data;
 a timer to generate a timing signal responsive to a user-configurable time interval; and
 a circuit to move the ingressing data or the egressing data from the memory at least partially responsive to the timing signal generated by the timer.

2. The apparatus of claim 1, wherein the ingressing data is received at a network-facing interface and wherein the circuit is to move the ingressing data from the memory to a device-facing interface.

3. The apparatus of claim 2, wherein the circuit is to provide default data responsive to receiving the timing signal and not finding new data in the memory, wherein the default data comprises one or more of pre-specified data and previously received data.

4. The apparatus of claim 2, wherein the circuit comprises a device-side circuit, and wherein the apparatus comprises: a network-side circuit to move the ingressing data from the network-facing interface to the memory.

5. The apparatus of claim 4, wherein the timer is to generate the timing signal a delay time after an expected reception time of the ingressing data at the network-facing interface, the delay time related to a write time for writing the ingressing data to the memory.

6. The apparatus of claim 4, wherein the device-facing interface is to be communicatively coupled to a controller of an industrial automation control system, the controller in communication, via a network switch, with a sensor and a motor-drive to move an observed position of a motor-controlled apparatus towards a desired position of the motor-controlled apparatus.

7. The apparatus of claim 4, wherein the device-facing interface is to be communicatively coupled to one or more of a sensor and a motor-drive, both the sensor and the motor-drive in communication, via a network switch, with a controller of an industrial automation control system to move an observed position of a motor-controlled apparatus to a desired position of the motor-controlled apparatus.

8. The apparatus of claim 1, wherein the egressing data is received at a device-facing interface, wherein the circuit is to move the egressing data from the memory to a network-facing interface.

9. The apparatus of claim 8, wherein the timer comprises a network-side timer, wherein the timing signal comprises a network-side timing signal, wherein the user-configurable time interval comprises a network-side user-configurable time interval, wherein the circuit comprises a network-side circuit, and wherein the apparatus comprises:
a device-side timer to generate a device-side timing signal; and
a device-side circuit to move the egressing data from the device-facing interface to the memory least partially responsive to the device-side timing signal.

10. The apparatus of claim 9, wherein the network-side timer is to generate the network-side timing signal a delay time after the device-side timer generates the device-side timing signal, the delay time related to a write time for writing the egressing data to the memory.

11. The apparatus of claim 8, wherein the circuit comprises a network-side circuit, and wherein the apparatus comprises:
a device-side circuit to move the egressing data from the device-facing interface to the memory.

12. The apparatus of claim 11, wherein the timer is to generate the timing signal a delay time after an expected reception time of the egressing data at the device-facing interface, the delay time related to a write time for writing the egressing data to the memory.

13. An apparatus, comprising:
a network switch to enable communication in an industrial automation control system;
a memory to store data ingressing from, or egressing to, the network switch;
a timer to generate a timing signal responsive to a user-configurable time interval; and
a circuit to move the data to, or from, the memory at least partially responsive to the timing signal generated by the timer.

14. The apparatus of claim 13, wherein the industrial automation control system comprises a controller, a motor-drive, and a sensor in communication via the network switch to move an observed position of a motor-controlled apparatus towards a desired position of the motor-controlled apparatus.

15. A system, comprising:
a component of an industrial automation control system, the component comprising one or more of a controller, a motor-drive, and a sensor, the component in communication with further components of the industrial automation control system via a network switch;
a memory arranged to store data ingressing to the component from the network switch or data egressing from the component to the network switch;
a timer to generate a timing signal responsive to a user-configurable time interval; and
a circuit to move the data to, or from, the memory at least partially responsive to the timing signal generated by the timer.

16. The system of claim 15, wherein the further components of the industrial automation control system comprise: two or more of a controller, a motor-drive, and a sensor in communication via the network switch to move an observed position of a motor-controlled apparatus towards a desired position of the motor-controlled apparatus.

17. A method comprising:
receiving a data packet at a network-facing interface;
writing data of the data packet into a memory;
receiving a timing signal; and
responsive to the timing signal, providing the data from the memory at a device-facing interface.

18. The method of claim 17, comprising generating the timing signal a delay time after an expected receive time of the data packet at the network-facing interface, the delay time related to a write time for writing the data to the memory.

19. A method comprising:
receiving data at a device-facing interface;
writing the data to a memory;
receiving a timing signal; and
responsive to the timing signal, providing a data packet including the data at a network-facing interface.

20. The method of claim 19, comprising generating the timing signal a delay time after an expected receive time of the data at the device-facing interface, the delay time related to a write time for writing the data to the memory.

* * * * *

UNITED STATES PATENT AND TRADEMARK OFFICE
CERTIFICATE OF CORRECTION

| | | |
|---|---|---|
| PATENT NO. | : 12,135,902 B2 | Page 1 of 1 |
| APPLICATION NO. | : 17/812379 | |
| DATED | : November 5, 2024 | |
| INVENTOR(S) | : Lars Ellegaard and Torkil Oelgaard | |

It is certified that error appears in the above-identified patent and that said Letters Patent is hereby corrected as shown below:

In the Specification

| | | |
|---|---|---|
| Column 4, | Line 19, | change "and a VLAD tag," to --and a VLAN tag,-- |
| Column 16, | Line 33, | change "data 508 egres sing from one" to --data 508 egressing from one-- |

Signed and Sealed this
Twenty-first Day of January, 2025

Coke Morgan Stewart
*Acting Director of the United States Patent and Trademark Office*